(12) United States Patent
Yoshida

(10) Patent No.: US 12,661,746 B2
(45) Date of Patent: Jun. 23, 2026

(54) TOOL MAGAZINE APPARATUS

(71) Applicant: OKUMA CORPORATION, Niwa-gun (JP)

(72) Inventor: Makoto Yoshida, Niwa-gun (JP)

(73) Assignee: OKUMA CORPORATION, Niwa-Gun (JP)

( * ) Notice: Subject to any disclaimer, the term of this patent is extended or adjusted under 35 U.S.C. 154(b) by 628 days.

(21) Appl. No.: 18/187,214

(22) Filed: Mar. 21, 2023

(65) Prior Publication Data

US 2023/0302592 A1     Sep. 28, 2023

(30) Foreign Application Priority Data

Mar. 24, 2022     (JP) ................................. 2022-048375

(51) Int. Cl.
B23Q 3/157 (2006.01)
B23Q 3/155 (2006.01)

(52) U.S. Cl.
CPC ..... B23Q 3/15533 (2013.01); B23Q 3/15536 (2016.11); B23Q 3/15773 (2013.01); (Continued)

(58) Field of Classification Search
CPC ........... Y10T 483/115; Y10T 483/1714; Y10T 483/1717; Y10T 483/1845; (Continued)

(56) References Cited

U.S. PATENT DOCUMENTS 5,281,194 A  *  1/1994  Schneider .......... B23Q 3/15536
                                                            483/62
2004/0162201 A1*  8/2004  Ferrari ............... B23Q 3/15513
                                                            483/49

(Continued)

FOREIGN PATENT DOCUMENTS

DE     202011001493 U1 *  5/2011  ............. B23Q 1/015
DE     202020101328 U1 *  5/2020  ......... B23Q 3/15539

(Continued)

OTHER PUBLICATIONS

Notice of Reasons for Refusal mailed May 27, 2025, issued in the corresponding JP patent application No. 2022-48375 and its machine translation.

*Primary Examiner* — Sunil K Singh
*Assistant Examiner* — Michael Vitale
(74) *Attorney, Agent, or Firm* — Troutman Pepper Locke LLP; James E. Armstrong, IV; Gabrielle L. Gelozin

(57)          ABSTRACT
Provided is a tool magazine apparatus that has excellent workability and is capable of being downsized. A tool replacement device includes a fixed frame installed in an opening portion provided at a predetermined position of a tool magazine, a swivel frame disposed inside the fixed frame so as to be rotatable about a swivel axis extending in a vertical direction, and a tool replacement rack fixed to the swivel frame. The swivel frame is rotated to a deliverable position at which the tool replacement rack is parallel to a tool rack inside the tool magazine to enable a tool to be delivered between the tool replacement rack and a tool transfer device, and to a replaceable position at which the tool replacement rack is located outside the tool magazine to enable replacement of old and new tools.

4 Claims, 8 Drawing Sheets

(52) U.S. Cl.
CPC ....... *B23Q 3/15539* (2016.11); *Y10T 483/115*
*(2015.01); Y10T 483/1873* (2015.01)

(58) Field of Classification Search
CPC ......... Y10T 483/1855; Y10T 483/1873; Y10T
483/1882; B23Q 3/15533; B23Q 3/15536;
B23Q 3/15539; B23Q 3/15773
USPC ........................ 483/3, 36, 37, 63, 64, 66, 67
See application file for complete search history.

(56) References Cited

U.S. PATENT DOCUMENTS

| | | | | |
|---|---|---|---|---|
| 2017/0087682 A1 * | 3/2017 | Leonhard | ................. | F16M 1/00 |
| 2020/0189055 A1 * | 6/2020 | Kimura | ............. | B23Q 3/15724 |
| 2022/0176506 A1 * | 6/2022 | Kintoki | ............. | B23Q 3/15773 |
| 2024/0058880 A1 * | 2/2024 | Müller | ............. | B23Q 3/15533 |

FOREIGN PATENT DOCUMENTS

| | | | | | |
|---|---|---|---|---|---|
| EP | 2295199 A1 | * | 3/2011 | ........ | B23Q 3/15539 |
| EP | 2823933 A1 | * | 1/2015 | ........ | B23Q 3/15536 |
| FR | 2907357 A1 | * | 4/2008 | ............ | B23Q 11/08 |
| JP | H10227163 A | * | 8/1998 | ........ | B23Q 3/15539 |
| JP | 2000-61758 A | | 2/2000 | | |
| JP | 2001165393 A | * | 6/2001 | ............ | B23Q 11/08 |
| JP | 2004306185 A | * | 11/2004 | ............ | B23Q 11/08 |
| JP | 2009-66695 A | | 4/2009 | | |

* cited by examiner

TOOL MAGAZINE APPARATUS

DETAILED DESCRIPTION OF THE PRESENT INVENTION

Technical Field

The present invention relates to a tool magazine apparatus that is disposed in a machine tool having an automatic tool changing function, such as a machining center, and that is configured to perform automatic tool change between the tool magazine apparatus and a spindle.

BACKGROUND ART

In this description, the term "tool" means a tool as a single component in some cases, and also means a combination of a tool as a single component and a tool holder to which the tool is attached in other cases.

A machining center having an automatic tool changing function includes a spindle, a tool magazine apparatus configured to store a plurality of tools, and an automatic tool changing apparatus configured to change tools between the spindle and the tool magazine apparatus. A known tool magazine apparatus to be used in such a machining center includes a tool magazine (multiple-tool magazine) in which a plurality of tool racks configured to store tools in a direction orthogonal to an axial direction of the tool in a row are arranged.

Regarding tools inside the tool magazine, in accordance with a workpiece to be machined or in association with wear, breakage, etc., of the tools, it is necessary to replace an old tool, such as a tool that has come to an end of its life, with a new tool to be used. Therefore, the tool magazine apparatus used in the machining center having the automatic tool changing function is typically provided, at its tool replacement position that is away from its tool change position, with a tool replacement device configured to replace a tool inside the tool magazine, in addition to an automatic tool changing device.

Patent Literature 1 discloses an example of the tool replacement device used in such a tool magazine apparatus, which includes: a movable bench consisting of a first slider, a second slider, and a third slider; and upper and lower doors configured to open and close in association with movement of the sliders.

CITATION LIST

Patent Literature

Patent Literature 1: Japanese Unexamined Patent Application Publication No. 2009-66695

SUMMARY OF THE INVENTION

Problem to be Solved by the Invention

In a machine tool including a multiple-tool magazine, in order to prepare an unmanned operation for a long period of time, work of replacing old and new tools is required, and therefore a tool replacement device is provided therein. In a case where an operator performs tool replacement, operation of the tool magazine apparatus needs to be stopped to open the door and replace the tools, which means, in a case where there arises a need for tool replacement during machining, machining needs to be interrupted in some cases.

The tool replacement device is required to be capable of performing replacement work without interrupting an machining operation, to have excellent workability in the replacement work, to be downsized, etc., and conventional ones have still been insufficient in these respects.

The present invention has been made in view of the above-described problems that the conventional technology has, and an object of the present invention is to provide a tool magazine apparatus that has excellent workability and is capable of being downsized.

Means for Solving the Problem

The tool magazine apparatus of the present invention is a tool magazine apparatus comprising: a tool magazine in which a plurality of tool racks are arranged, each tool rack being configured to store tools in a direction orthogonal to an axial direction of a tool in a row; a tool transfer device configured to transfer a tool inside the tool magazine to a required position; and a tool replacement device configured to replace an old tool inside the tool magazine with a new tool outside the tool magazine, wherein the tool replacement device includes a fixed frame installed in an opening portion provided at a predetermined position of the tool magazine, a swivel frame disposed inside the fixed frame so as to be rotatable about a swivel axis extending in a vertical direction, and a tool replacement rack fixed to the swivel frame, and the swivel frame is rotated to a deliverable position at which the tool replacement rack is parallel to the tool rack inside the tool magazine to enable a tool to be delivered between the tool replacement rack and the tool transfer device, and to a replaceable position at which the tool replacement rack is located outside the tool magazine to enable replacement of old and new tools.

Regarding the axial direction of the tool, the tool may be placed in a horizontal direction or may be placed in a vertical direction, and correspondingly to these, there are a tool rack in which a plurality of tool storage parts are provided in the vertical direction, and a tool rack in which a plurality of tool storage parts are provided in the horizontal direction, respectively. The swivel axis is, in either case, designed to have an axis extending in the vertical direction (up-down direction).

In accordance with the tool magazine apparatus of the present invention, turning the swivel frame to the replaceable position makes it possible to replace old and new tools (The replacement may be manually performed by an operator or may be automatically performed using a swiveling device, a robot, etc.), and turning the swivel frame to the deliverable position thereby allowing the tool transfer device to move makes it possible to enable a continuous operation of the tool magazine apparatus while performing work of replacing a plurality of new and old tools. Here, because replacement of the tools is enabled by turning the swivel frame, the tool magazine apparatus has excellent workability, and downsizing of the apparatus is also enabled.

It is preferable that a swivel cover configured to cover an inside of the swivel frame from an outside of the tool magazine is provided so as to be integrally rotatable with the swivel frame.

With this configuration, in a case where the swivel frame is at the deliverable position, with respect to an operator who is outside the tool magazine, because the tool replacement rack located inside the tool magazine is covered with the cover from the front side, safety of the operator is ensured, and in a case where the swivel frame is at the replaceable position, with respect to the operator who is outside the tool magazine, because the tool replacement rack located outside the tool magazine is covered with the cover from the back side, safety of the operator is ensured.

It is preferable that a controller enables the tool transfer device to stop outside a swivel area of the swivel frame, and lock switches that are capable of locking of the swivel frame at each of the replaceable position and the deliverable position and capable of releasing the locking are provided.

With this configuration, at the time when the tool transfer device moves, the lock switch causes the swivel frame to be locked, and therefore to be unrotatable, whereby the state in which the tool magazine apparatus is in operation is ensured. At the time of the replacement of a tool, releasing the locking of the lock switch allows the swivel frame to be manually rotated, thereby moving the tool replacement rack to the outside of the tool magazine, which enables manual replacement of an old tool with a new tool. Thereafter, the controller makes it possible to stop the tool transfer device outside the swivel area of the swivel frame, release the locking of the lock switch, and rotate the swivel frame to the deliverable position manually, whereby the tool magazine apparatus is returned to its operation state.

It is preferable that the swivel axis is designed to connect intermediate positions of upper and lower horizontal members of the swivel frame with each other.

With this configuration, the swivel area of the swivel frame is made small, and a space necessary for installation of the tool magazine apparatus is made small.

Advantageous Effects of the Invention

With the tool magazine apparatus of the present invention, because turning the swivel frame makes it possible to replace tools, its workability is excellent and it becomes possible to downsize the apparatus.

DESCRIPTION OF EMBODIMENTS

Embodiments of the present invention will be described below, with reference to the drawings. In the following description, the right and left sides of FIG. 1 will be referred to as "right" and "left", respectively, the lower side of FIG.

Figure 1:
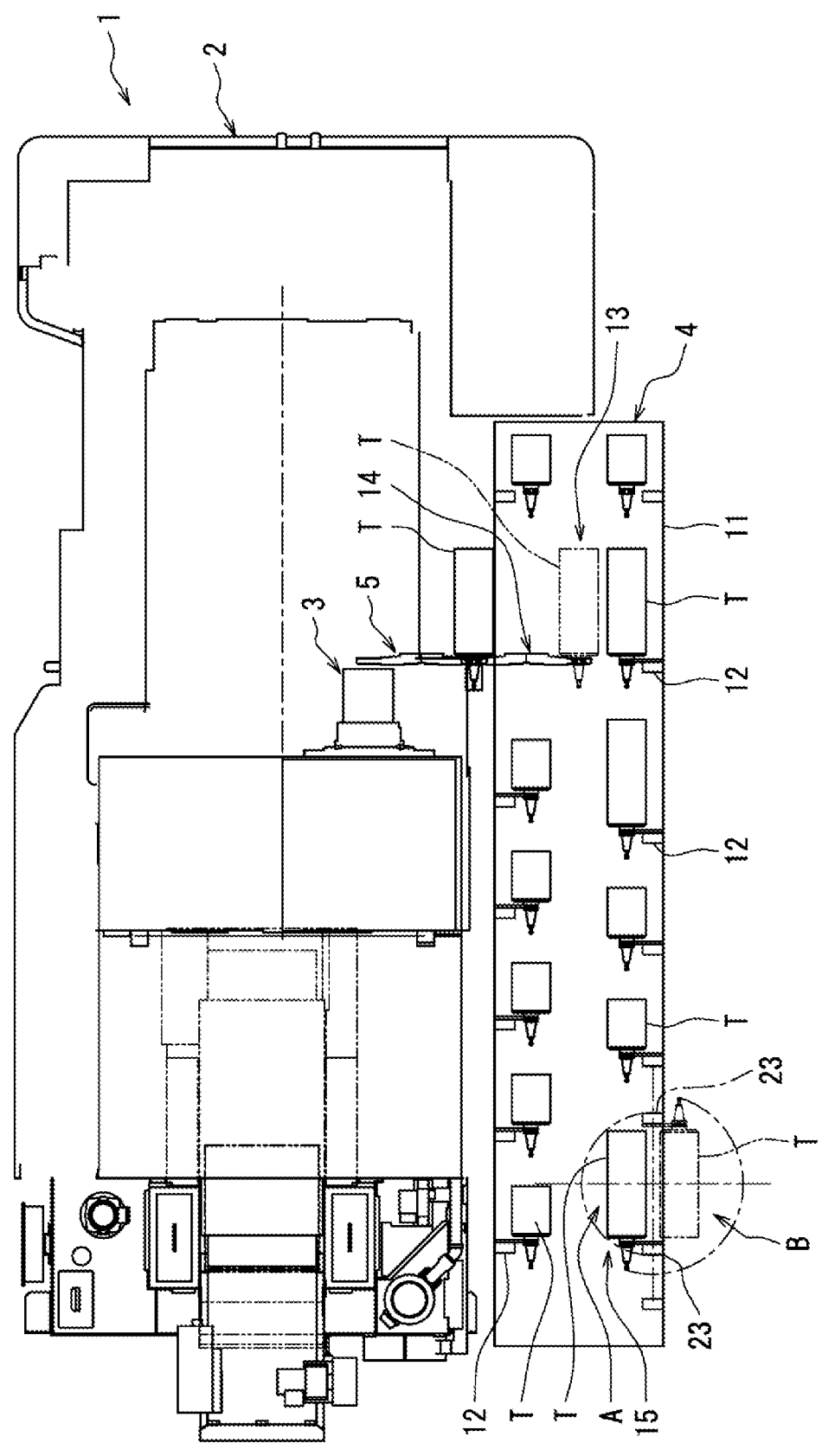
FIG. 1 is a plan view of a machining center, showing an example of a machine tool in which a tool magazine apparatus of the present invention is used.

1 will be referred to as "front (front side)" and the upper side will be referred to as "rear (back side)", and the near and farther sides of the sheet of FIG. 1 will be referred to as "upper" and "lower" sides, respectively.

FIG. 1 shows a horizontal machining center (1) having an automatic tool changing function, which is an example of a machine tool in which a tool magazine apparatus according to the present invention is used.

The machining center (1) includes a spindle (3) movably disposed in a machining chamber (2), a tool magazine apparatus (4) configured to store a plurality of tools (T), and an automatic tool changing apparatus (5) configured to perform tool (T) change between the spindle (3) and the tool magazine apparatus (4).

The tool magazine apparatus (4) includes: a tool magazine (11) in which a plurality of tool racks (12) configured to hold various tools (T) having different lengths, diameters, etc., are arranged; a tool transfer device (13) configured to transfer a tool (T) held by the tool rack (12) to a required position; an intra-magazine tool changing device (14) configured to change a tool (T) between the intra-magazine tool changing device (14) and the automatic tool changing apparatus (5); and a tool replacement device (15) configured to replace an old tool (T), such as a tool that has come to an end of its life, a broken tool, etc., which is located inside the tool magazine (11), with a new tool (T) to be used, which has been prepared outside the tool magazine (11).

Figure 2:
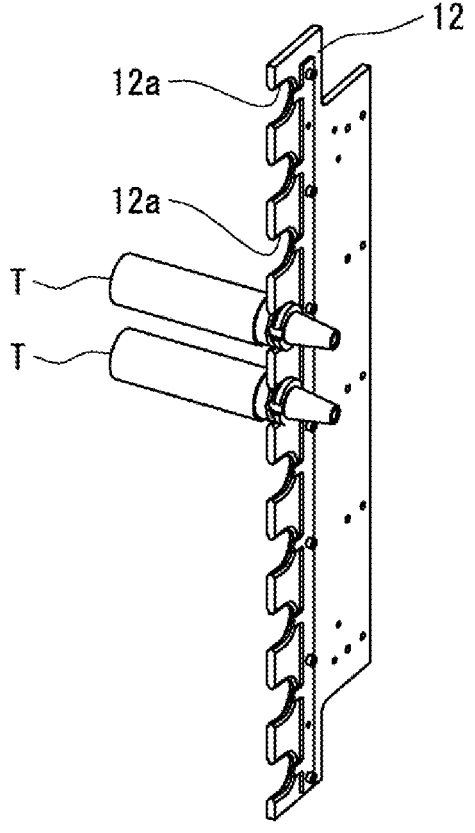
FIG. 2 is a perspective view of a tool rack used in the tool magazine apparatus shown in FIG. 1.

Each tool rack (12) in this embodiment is, as shown in FIG. 2, configured such that tool storage parts (12a) are arranged in the up-down direction in a row, to store tools (T) in the up-down direction (vertical direction) orthogonal to the right-left direction (axial direction of the tool (T)) in a row. The tool racks (12) are arranged in two rows, i.e., some of the tool racks (12) are arranged on the front side and openings of their tool storage parts (12a) are directed rearward, and the other of the tool racks (12), which are structured oppositely to the some of the tool racks (12), are arranged on the rear side and openings of their tool storage parts (12a) are directed frontward.

Although not shown in detail, the tool transfer device (13) moves in the right-left direction between the two rows of the tool racks (12) (at a position of a tool (T) indicated by an alternate long and two short dashes line inside the tool magazine (11) in FIG. 1) and moves in the up-down direction along the tool rack (12) to transfer a tool (T), thereby being capable of transferring a tool (T) that has been stored at a required tool storage part (12a) of a required tool rack (12) to the intra-magazine tool changing device (14) and being capable of transferring an old tool (T) from the intra-magazine tool changing device (14) to the tool replacement device (15).

The intra-magazine tool changing device (14) is capable of receiving a tool (T) from the tool transfer device (13), and delivering the tool (T), as a tool (T) to be used next, to the automatic tool changing apparatus (5), and is capable of receiving an old tool (T) from the automatic tool changing apparatus (5), and delivering the old tool (T) to the tool transfer device (13).

The tool replacement device (15) is disposed in a rectangular opening portion formed on a front and left side of the tool magazine (11) as shown in FIG. 1 (the position of the opening portion is not restricted to this, and may be at an appropriate position). This tool replacement device (15) enables an operator to move an old tool (T) located at a position of A (inside the tool magazine (11)) and indicated by a solid line to a position of B (outside the tool magazine (11)) indicated by an alternate long and two short dashes line, replace the old tool (T) with a new tool (T), and thereafter move the new tool (T) to the position of A (inside the tool magazine (11)), whereby replacement of the old and new tools (T) is performed.

The tool replacement device (15), as shown in FIG. 3 to FIG. 7, includes: a rectangular fixed frame (21) fitted into the rectangular opening portion formed in the tool magazine (11); a rectangular swivel frame (22) disposed inside the fixed frame (21) so as to be rotatable about a swivel axis extending in the vertical direction; a tool replacement rack (23) fixed to the swivel frame (22); and covers (24), (25).

The swivel frame (22) is supported by the fixed frame (21) so as to be rotatable about an axis extending in the up-down direction (vertical direction) via upper and lower bearings (26), (27) that are disposed between an approximately center portion of the upper horizontal member (21a) of the fixed frame (21) and an approximately center portion of the upper horizontal member (22a) of the swivel frame (22) and disposed between an approximately center portion of the lower horizontal member (21b) of the fixed frame (21) and an approximately center portion of the lower horizontal member (22b) of the swivel frame (22), respectively, whereby the swivel frame (22) rotates about the swivel axis extending in the vertical direction. It is possible for an operator to manually rotate the swivel frame (22).

On right and left sides on a lower surface of the upper horizontal member (21a) of the fixed frame (21), lock switches (28), (29) that enable locking of rotation of the swivel frame (22) relative to the fixed frame (21) and releasing the locking are provided.

Figure 3:
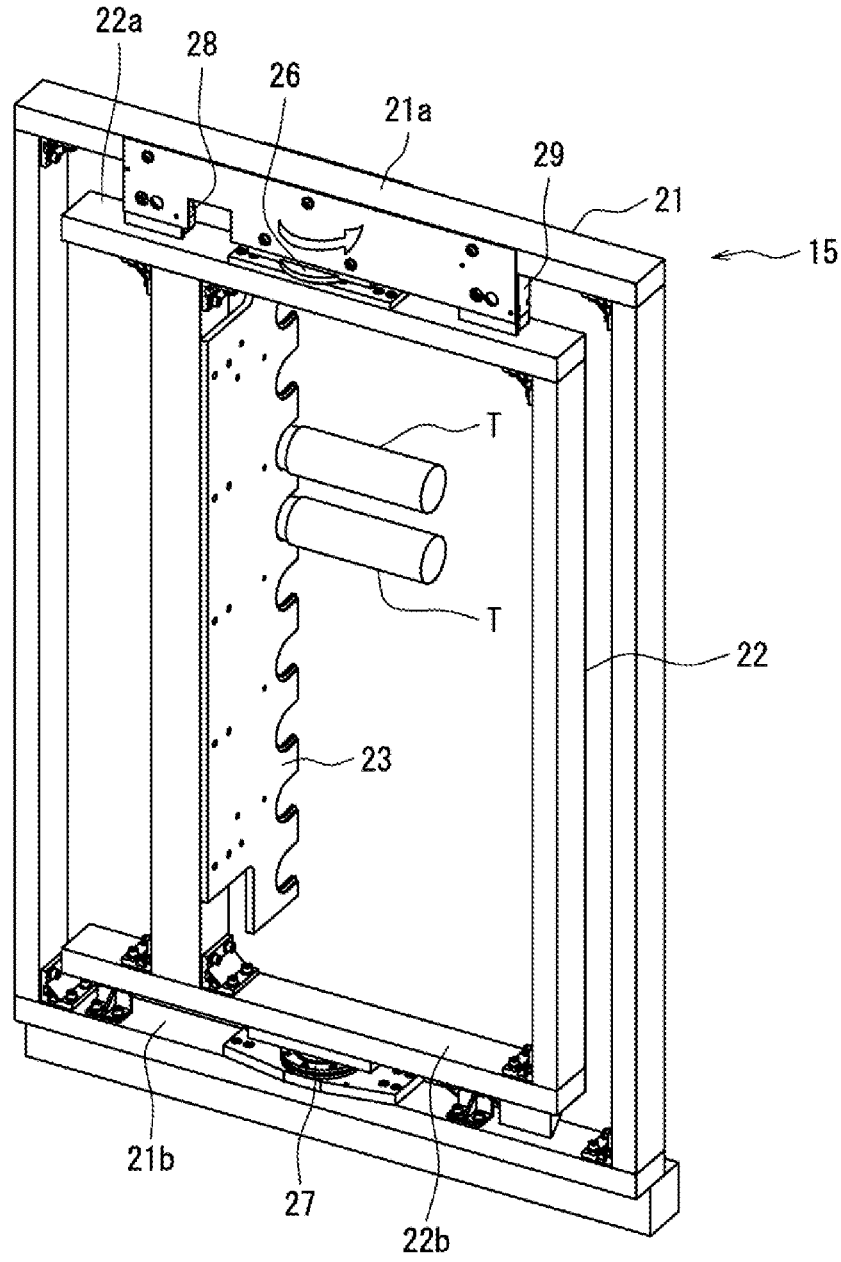
FIG. 3 is a perspective view showing a state where covers of a tool replacement device in the tool magazine apparatus of the present invention are removed, and shows a state when the tool magazine apparatus is in operation.

FIG. 3 shows the tool replacement device (15) in a state shown in the position of A of FIG. 1, with the covers (24), (25) removed. In this state, the tool replacement rack (23) is parallel to other racks, i.e., the tool racks (12) inside the tool magazine (11), where it is possible to transfer a tool (T) stored in the tool replacement rack (23) by means of the tool transfer device (13).

Figure 5:
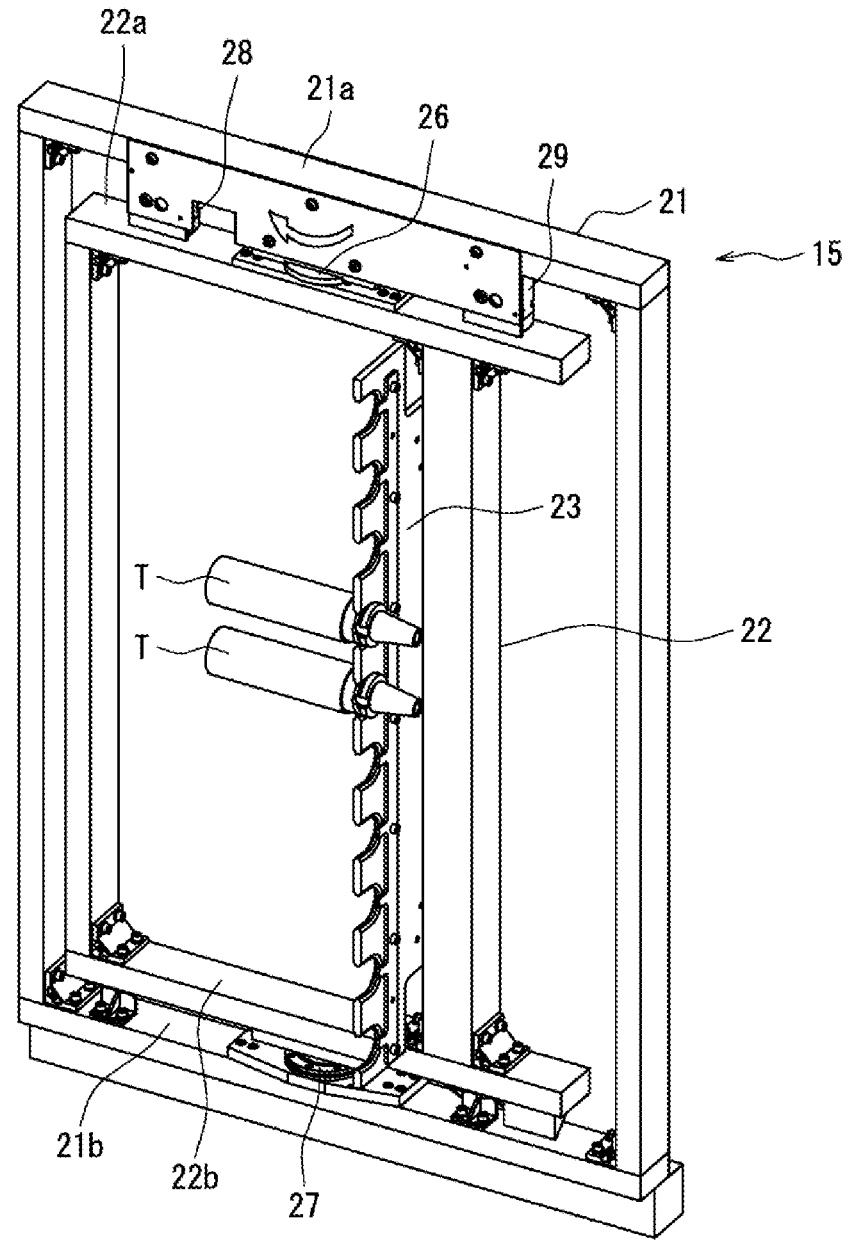
FIG. 5 is a perspective view showing a state where the swivel frame is rotated further from the state shown in FIG. 4 thereby allowing replacement of a tool.

FIG. 5 shows the tool replacement device (15) in a state shown in the position of B of FIG. 1, with the covers (24), (25) removed. In this state, the swivel frame (22) has been rotated 180 degrees from the state shown in FIG. 3, and the tool replacement rack (23) is facing outside the tool magazine (11) thereby allowing replacement of the tool (T).

Figure 4:
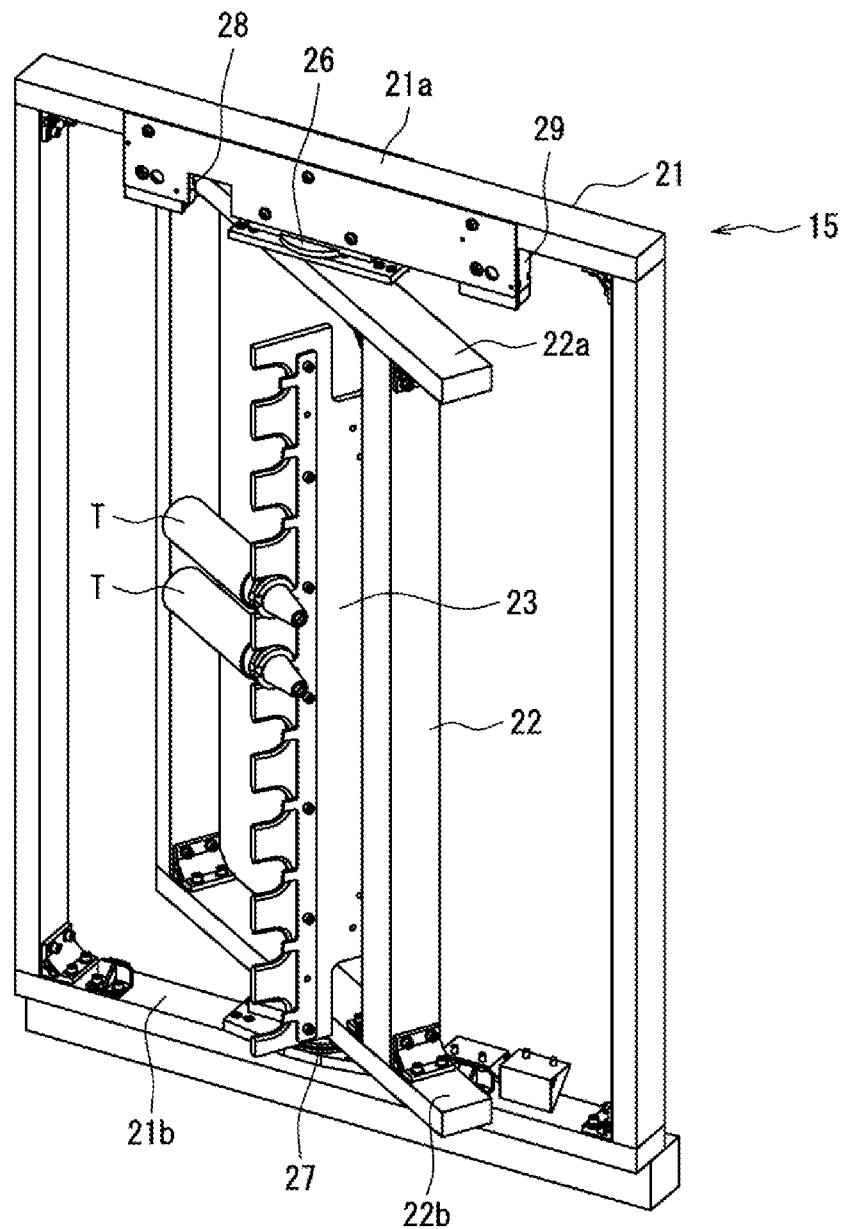
FIG. 4 is a perspective view showing a state where a swivel frame is rotated from the state shown in FIG. 3.

FIG. 4 shows a state where the swivel frame (22) has been rotated approximately 120 degrees from the state shown in FIG. 3, i.e., shows a halfway state from the state shown in FIG. 3 to the state shown in FIG. 5.

Figure 6:
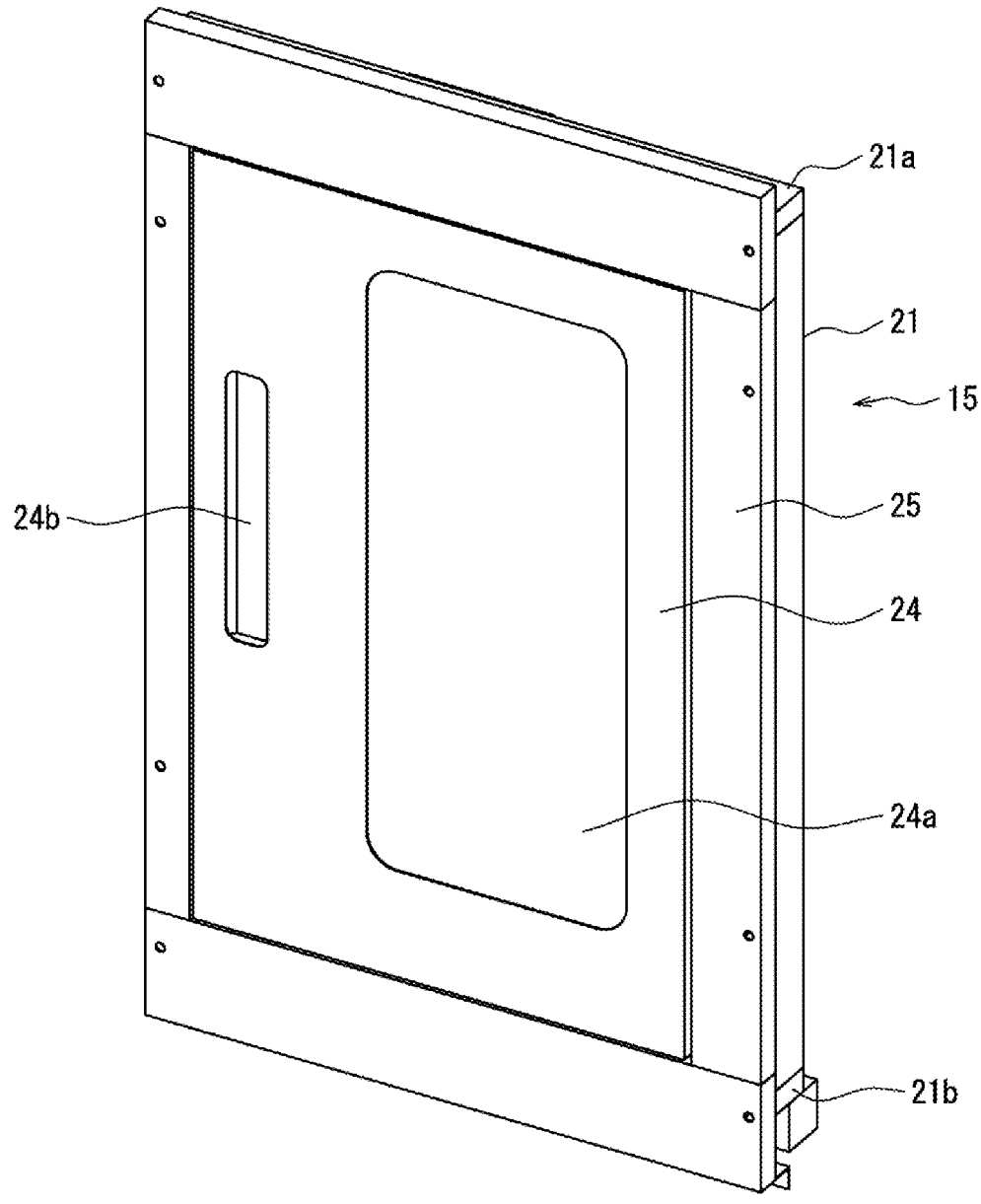
FIG. 6 is a perspective view showing covers of the tool replacement device, and shows a state when the tool magazine apparatus is in operation.

FIG. 6 shows the covers (24), (25) in a state shown in FIG. 3. These covers (24), (25) are, specifically: a rectangular swivel cover (24) that is fixed to the swivel frame (22) and is configured to rotate integrally with the swivel frame (22); and a fixed cover (25) having the shape of a rectangular frame and being fixed to the fixed frame (21) so as to surround the swivel cover (24).

The swivel cover (24) is provided with a rectangular window (24a) and a handle portion (including an opening into which the hand of an operator is inserted for gripping the handle) (24b).

In the tool replacement device (15) in the state as shown in the position of A of FIG. 1, as shown in FIG. 6, the fixed frame (21) and the swivel frame (22) are covered with the fixed cover (25) and the swivel cover (24), respectively, and it is possible to confirm, through a window (24a), the tool replacement rack (23) inside the tool magazine (11) and any tool (T) stored by the tool replacement rack (23).

Figure 7:
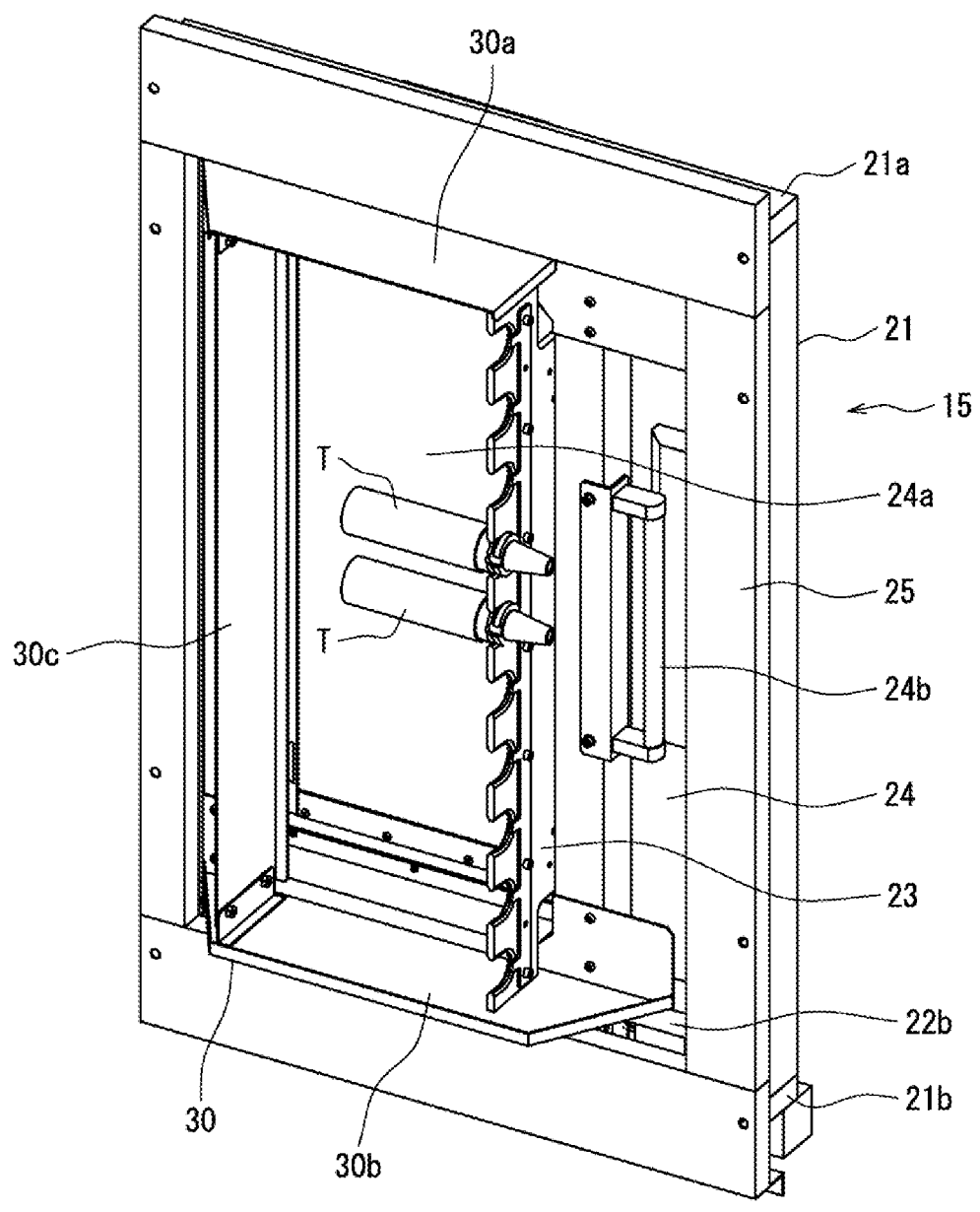
FIG. 7 is a perspective view showing the covers in a state where the swivel frame is rotated from the state shown in FIG. 6 thereby allowing replacement of the tool.

FIG. 7 shows the covers (24), (25) in a state shown in FIG. 5. That is, the swivel cover (24) rotates integrally with the swivel frame (22) to move to the back side, and the tool replacement rack (23) fixed to the swivel frame (22) moves to the front side.

As shown in FIG. 7, on the back side of the swivel frame (22), a reinforcing frame (30) having the shape of a horizontal U with right-angle corners is fixed. The reinforcing frame (30) consists of: upper and lower horizontal members (30a), (30b) configured to support upper and lower end portions of the tool replacement rack (23); and a vertical member (30c) connecting the upper and lower horizontal members (30a), (30b) so as to face the tool replacement rack (23).

In the tool replacement device (15) in the state shown in the position of B of FIG. 1, as shown in FIG. 7, when a work with respect to the tool replacement rack (23) is to be performed from the front side, because the swivel cover (24) covers the swivel frame (22) from the back side, safety of the work space is ensured, and also it becomes possible to confirm the inside of the tool magazine (11) through the window (24a).

In accordance with the tool magazine apparatus (4) of the above-described embodiment, when the tool replacement device (15) is in a state shown in FIG. 3 (the position of A in FIG. 1), the lock switch (28) is turned ON and the swivel frame (22) is locked, while the tool transfer device (13) moves freely between: any of the tool racks (12) or the tool replacement rack (23) inside the tool magazine (11); and the intra-magazine tool changing device (14), to transfer a required tool (T) to a required position.

When replacement of old and new tools (T) is required, an operator, firstly, causes the tool transfer device (13) to stop outside the swivel area of the swivel frame (22), and in this state, the lock switch (28) is turned OFF to cause the swivel frame (22) to be rotatable, thereby causing the swivel frame (22) to rotate through the state shown in FIG. 4 to reach the state shown in FIG. 5 (the position of B in FIG. 1). In this state, the lock switch (29) is turned ON whereby the swivel frame (22) is locked. This enables the tool transfer device (13) to freely move between: any tool rack (12) inside the tool magazine (11), excluding the tool replacement rack (23); and the intra-magazine tool changing device (14), thereby transferring a required tool (T) to a required position, where the state in which the tool magazine apparatus (4) is in operation is ensured.

When the tool replacement device (15) is in the state shown in FIG. 5, an operator takes out an old tool (T) from the tool replacement rack (23), and stores a new tool (T) in the tool replacement rack (23), whereby replacement of the old and new tools (T) is easily performed.

The replacement work is thus completed. Therefore, an operator causes the tool transfer device (13) to stop outside the swivel area of the swivel frame (22) beforehand (because, even during the replacement work, the tool transfer device (13) is transferring tools (T), this step should be implemented constantly), and in this state, the lock switch (29) is turned OFF to cause the swivel frame (22) to be rotatable, and the swivel frame (22) is rotated 180 degrees in the backward direction to return through the state in FIG. 4 to the state in FIG. 3. Thereafter, the lock switch (28) is turned ON to lock the swivel frame (22), whereby the tool magazine apparatus (4) is returned to its operation state where the tool transfer device (13) is allowed to freely move between: any tool rack (12) and the tool replacement rack (23) inside the tool magazine (11); and the intra-magazine tool changing device (14).

Figure 8:
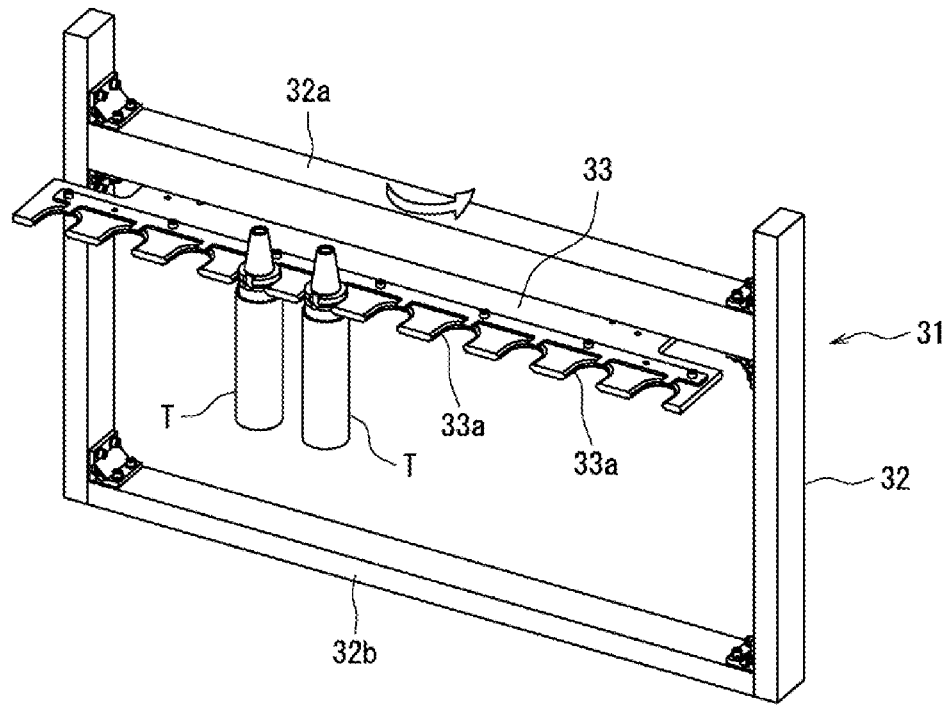
FIG. 8 is a perspective view showing another example of the swivel frame of the tool replacement device.

In the above-described embodiment, the tool magazine apparatus (4) in which the axial direction of the tool (T) is in the horizontal direction is shown, but the above-described tool magazine apparatus (4) is also applicable to a tool magazine apparatus in which the axial direction of the tool (T) is in the vertical direction. In this case, a tool replacement device (31), as shown in FIG. 8, includes, similarly to the one in the above-described embodiment: a rectangular fixed frame (not shown) fitted into the rectangular opening portion formed in the tool magazine; a rectangular swivel frame (32) disposed inside the fixed frame so as to be rotatable about a swivel axis extending in the vertical direction; a tool replacement rack (33) fixed to the swivel frame (32); and covers (not shown). The swivel frame (32) is supported by the fixed frame so as to be rotatable about the axis extending in the up-down direction (vertical direction) via bearings formed at respective center portions of the upper and lower horizontal members (32*a*) (32*b*), whereby the swivel frame (32) rotates about the swivel axis extending in the vertical direction.

The difference from the above-described embodiment is that the tool replacement rack (33) has tool storage parts (33*a*) arranged in the right-left direction in a row (as for other tool racks of the tool magazine, the tool storage parts (33*a*) are arranged in the right-left direction in a row), and tools (T) are stored in the right-left direction orthogonal to the up-down direction (axial direction of the tool (T)) in a row.

When replacing old and new tools (T) using the tool replacement device (15, 31), although it is possible to manually perform the replacement, including an operation of rotating the swivel frames (22, 32), but instead of this, it is also possible to automatically perform the replacement using a swiveling device, a robot, and so on.

REFERENCE SIGNS LIST (4): tool magazine apparatus
(11): tool magazine
(12): tool rack
(12*a*): tool storage part
(13): tool transfer device
(14): intra-magazine tool changing device
(15): tool replacement device
(21): fixed frame
(21*a*), (21*b*): upper and lower horizontal members
(22): swivel frame
(22*a*), (22*b*): upper and lower horizontal members
(23): tool replacement rack
(24): swivel cover
(25): fixed cover
(26), (27): bearings
(28), (29): lock switches
(T): tool
(31): tool replacement device
(32): swivel frame
(33): tool replacement rack

The invention claimed is:

1. A tool magazine apparatus for a machine tool, the tool magazine apparatus comprising:
   a tool magazine in which a plurality of tool racks are arranged, each of the plurality of tool racks being configured to store tools in a respective row, wherein a longitudinal axis of a tool stored in the row of one of the plurality of tool racks extends orthogonal to an axial direction of the row in which the tool is stored; and
   a tool replacement device configured to replace an old tool from at least one of the plurality of tool racks inside the tool magazine with a new tool provided from outside the tool magazine, wherein the tool replacement device includes:
   a fixed frame having a horizontal member, wherein the fixed frame is installed in an opening portion that is provided at a predetermined position of the tool magazine,
   a swivel frame disposed inside the fixed frame so as to be rotatable with respect to the fixed frame about a swivel axis extending in a vertical direction, and
   a tool replacement rack that is fixed to the swivel frame,
   wherein the swivel frame is rotatable to a deliverable position at which the tool replacement rack is parallel to the plurality of tool racks inside the tool magazine to enable old tools to be transferred from the tool replacement rack, and is rotatable to a replaceable position at which the tool replacement rack is located outside the tool magazine to enable replacement of the old tools from the plurality of tool racks with new tools provided from outside the tool magazine,
   wherein a swivel angle of the swivel frame from the deliverable position to the replaceable position is 180 degrees,
   wherein the swivel axis is located at an approximately center portion of the horizontal member between a first end of the horizontal member and an opposing second end of the horizontal member,
   wherein, on the first end of the horizontal member a first lock switch is provided, and on the opposing second end of the horizontal member a second lock switch is provided, the first lock switch when activated locking the swivel frame in the deliverable position and the second lock switch when activated locking the swivel frame in the replaceable position.

2. The tool magazine apparatus according to claim 1, wherein
   a swivel cover configured to cover an inside of the swivel frame from an outside of the tool magazine is provided so as to be integrally rotatable with the swivel frame.

3. The tool magazine apparatus according to claim 1, wherein
   a controller enables a tool transferrer to stop outside a swivel area of the swivel frame, and
   the tool transferrer is configured to transfer a tool inside the tool magazine to a required position.

4. The tool magazine apparatus according to claim 1, wherein
   the horizontal member is an upper horizontal member, and
   the swivel axis extends between the upper horizontal member and a lower horizontal member of the swivel frame.

* * * * *